United States Patent
Kubo et al.

(10) Patent No.: US 8,026,656 B2
(45) Date of Patent: Sep. 27, 2011

(54) FILM CONTAINING CONJUGATED POLYMER CHAINS AND METHOD OF PRODUCING THE SAME

(75) Inventors: Wataru Kubo, Inagi (JP); Hirokatsu Miyata, Hadano (JP); Atsushi Komoto, Moriya (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 12/791,590

(22) Filed: Jun. 1, 2010

(65) Prior Publication Data

US 2010/0308708 A1 Dec. 9, 2010

(30) Foreign Application Priority Data

Jun. 4, 2009 (JP) ................................. 2009-135312

(51) Int. Cl.
*H01J 1/62* (2006.01)

(52) U.S. Cl. ...... 313/483; 428/188; 427/331; 427/372.2

(58) Field of Classification Search .................. 313/483; 427/331, 372.2; 428/188
See application file for complete search history.

(56) References Cited

U.S. PATENT DOCUMENTS

2006/0147677 A1 7/2006 Miyata

*Primary Examiner* — Vip Patel
(74) *Attorney, Agent, or Firm* — Canon U.S.A., Inc., IP Division

(57) ABSTRACT

A method of producing a film containing an oxide having a plurality of tubular structures and a plurality of conjugated polymer chains includes preparing a solution by dissolving a precursor substance having a first site containing a precursor of the oxide and a second site containing a precursor of a component constituting the conjugated polymer chains; forming a film containing the oxide having the tubular structures on a substrate, the surface of which exhibits anisotropy, by applying the solution onto the substrate so that the tubular structures and the conjugated polymer chains are oriented; and forming the conjugated polymer chains in pores of the tubular structures by polymerizing the second site in the film formed on the substrate, wherein an inorganic component of the first site is connected to carbon of the second site through a covalent bond.

7 Claims, 5 Drawing Sheets

FILM CONTAINING CONJUGATED POLYMER CHAINS AND METHOD OF PRODUCING THE SAME

BACKGROUND OF THE INVENTION

1. Field of the Invention

The present invention relates to a film containing an oxide and conjugated polymer chains and a method of producing the film. In particular, application to electronic devices and optical devices is expected using conjugated polymer chains.

2. Description of the Related Art

Conjugated polymers have been widely studied because they have desirable characteristics required for electronic materials and luminescent materials. Since such conjugated polymers have a conjugated structure in the main chain direction, they exhibit high electrical conductivity in that direction. Accordingly, if the main chains of conjugated polymers are extended and oriented, it is possible to utilize the physical properties of conjugated polymer materials more effectively. However, at present, there are no satisfactory techniques for orienting the main chains of conjugated polymers, and thus conjugated polymers are often used in random orientations.

Accordingly, in general, when a plurality of electrodes are connected to a conjugated polymer material and electric charges are transferred, a direction in which the electric charges are transferred in the conjugated polymer material (i.e., direction between the electrodes) does not always coincide with an extension direction of the main chain of the conjugated polymer material.

Consequently, in the process of transferring electric charges between the plurality of electrodes, charge transfer between different polymers is required to occur a large number of times. Such a charge transfer between different polymers is carried out by hopping, and therefore, the speed of the charge transfer is lower than that in the case where electric charges are transferred within the same polymer. Accordingly, a film containing a conjugated polymer cannot achieve high electrical conductivity, and thus improvement has been desired.

To overcome this problem, U.S. Patent Application No. 2006/0147677 has proposed that the electrical conductivity is improved by orienting the main chain of a conjugated polymer.

U.S. Patent Application No. 2006/0147677 discloses a method of producing a structured material in which a tubular-structured oxide is arranged so as to be parallel to a boundary surface with a substrate, and an electrically conductive conjugated polymer is carried in pores in the tubular structure.

However, in the method of producing the structured material described in U.S. Patent Application No. 2006/0147677, a surfactant does not contain a precursor of the oxide but contains only a functional group for forming the conjugated polymer. Accordingly, the distance between the functional group to be polymerized and a wall portion of the oxide is not exclusively determined on the basis of the molecular structure of the surfactant. As a result, in conducting the polymerization between functional groups for forming the conjugated polymer, the positions of the functional groups are not always completely controlled. Consequently, conjugated polymer chains having a sufficient molecular weight are not always formed.

SUMMARY OF THE INVENTION

The present invention provides a method of producing a film containing conjugated polymer chains in which the conjugated structure is extended as compared with the conjugated structure in the related art.

In a method of producing a film according to an aspect of the present invention, a method of producing a film containing an oxide having a plurality of tubular structures and a plurality of conjugated polymer chains includes preparing a solution by dissolving a precursor substance having a first site containing a precursor of the oxide and a second site containing a precursor of a component constituting the conjugated polymer chains; forming a film containing the oxide having the tubular structures on a substrate, the surface of which exhibits anisotropy, by applying the solution onto the substrate so that the tubular structures and the conjugated polymer chains are oriented; and forming the conjugated polymer chains in pores of the tubular structures by polymerizing the second site in the film formed on the substrate, wherein an inorganic component of the first site is connected to carbon of the second site through a covalent bond.

Further aspects of the present invention will become apparent from the following description of exemplary embodiments with reference to the attached drawings.

DESCRIPTION OF THE EMBODIMENTS

Figure 1A:
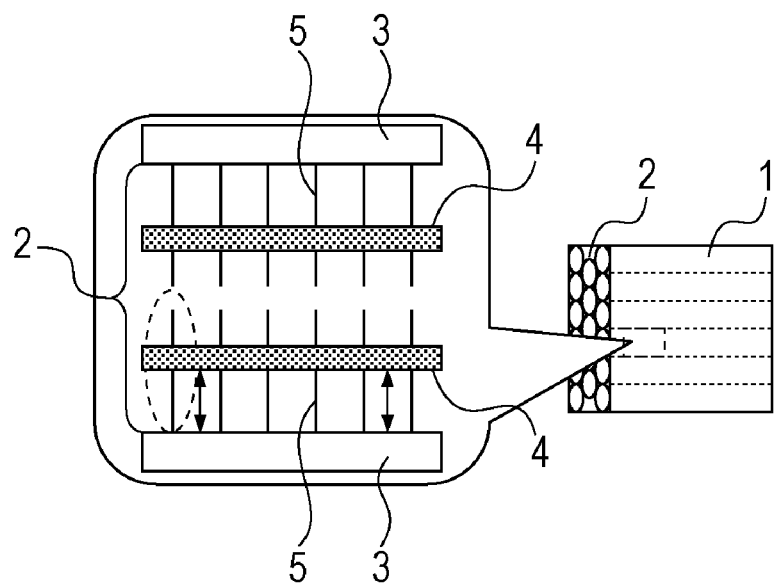
FIGS. 1A and 1B are schematic views each showing a film containing conjugated polymer chains.
Figure 1B:
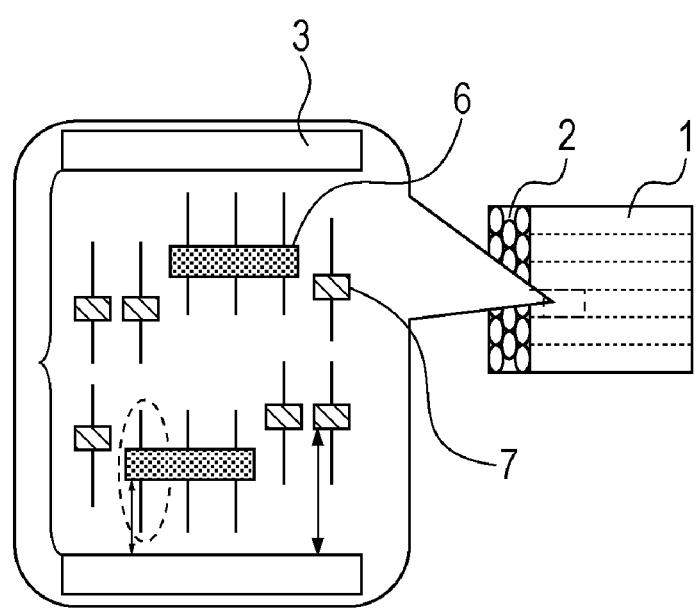

A film containing conjugated polymer chains of the present invention will now be described with reference to the attached drawings. FIG. 1A is a schematic view of a film containing conjugated polymer chains according to an embodiment of the present invention. FIG. 1B is a schematic view of a film containing a conjugated polymer disclosed in U.S. Patent Application No. 2006/0147677.

(Film According to First Embodiment of the Present Invention)

As shown in FIG. 1A, a film 1 containing conjugated polymer chains has a plurality of tubular structures 2. When one of the tubular structures 2 is enlarged, conjugated polymer chains 4 are present in a pore constituted by a wall 3 containing an oxide. Each of the conjugated polymer chains 4 and the wall 3 is connected through covalent bonds 5. The conjugated polymer chains 4 are present in each of the plurality of tubular structures 2.

In this embodiment, carbon atoms constituting each conjugated polymer chain 4 and an inorganic component constituting the film 1 or the wall 3 are connected through covalent bonds (also referred to as "bonding portions") 5. It is sufficient that a covalent bond is present in each of the bonding portions 5, and the length of each bonding portion 5 can be adjusted by adding an alkyl chain or the like to a conjugated bond.

According to this configuration, during polymerization, portions to be polymerized readily accumulate in an area where the distance from the wall is constant. Consequently, it is possible to obtain a film in which the conjugated structure is extended, as compared with a film containing a conjugated polymer in the related art.

Furthermore, in FIG. 1A, the tubular structures are oriented in one direction. In such a case, by providing electrodes at both ends of the film, the film is expected to be applied to an electronic device. In this case, an embodiment is assumed in which the plurality of electrodes are electrically connected to the conjugated polymer chains in the film. Furthermore, when the conjugated polymer chains are luminescent conjugated polymer chains, the film is expected to be applied to a self-luminous light-emitting device that emits light when being irradiated with light.

The orientation can be adequately selected in accordance with how the film of this embodiment is applied to a device. For example, it is possible to form a structure in which a conjugated polymer chain rectilinearly extending from an end is bent at a halfway position at an angle in the range of 45° to 135°.

(Film Disclosed in U.S. Patent Application No. 2006/0147677)

For comparison, the film disclosed in U.S. Patent Application No. 2006/0147677 will be described with reference to the schematic view of FIG. 1B. FIG. 1B also shows a film 1 containing a conjugated polymer and a plurality of tubular structures 2. However, the difference between the film of the embodiment of the present invention and the film in the related art becomes clear when the tubular structures are enlarged.

In the technology disclosed in U.S. Patent Application No. 2006/0147677, two types of materials, namely, tetraethoxysilane (TEOS) serving as a precursor substance for forming an oxide wall 3 and a surfactant 7 serving as a precursor substance for forming a conjugated polymer 6 are used in the production of the film.

In such a case, after an oxide film is formed, the conjugated polymer is formed by polymerization. However, the positions of the molecules of the surfactant 7, which is the precursor substance of the conjugated polymer, are not always at a constant distance from the wall. Therefore, even when a polymerization reaction is conducted, only polymerization sites of molecules of the surfactant 7 that are at positions where the polymerization can be conducted react and polymerization sites of molecules of the surfactant 7 that are at distant positions cannot react with each other. Accordingly, the length of the conjugated structure of the resulting conjugated polymer is not always sufficient.

FIG. 1B is a conceptual view showing this phenomenon.
(Superiority of Film of this Embodiment)

A high electrical conductivity can be achieved by forming conjugated polymer chains of this embodiment. The reason for this will be described with reference to FIGS. 2A and 2B.

Figure 2A:
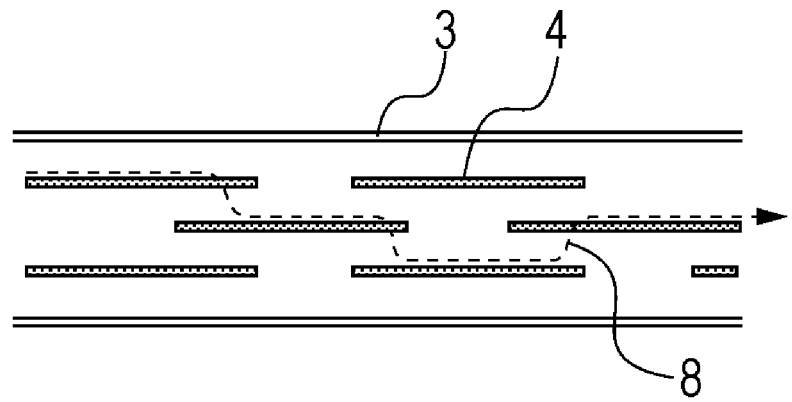
FIGS. 2A and 2B are schematic views each showing transfer of electric charges in a tubular structure in a film.
Figure 2B:
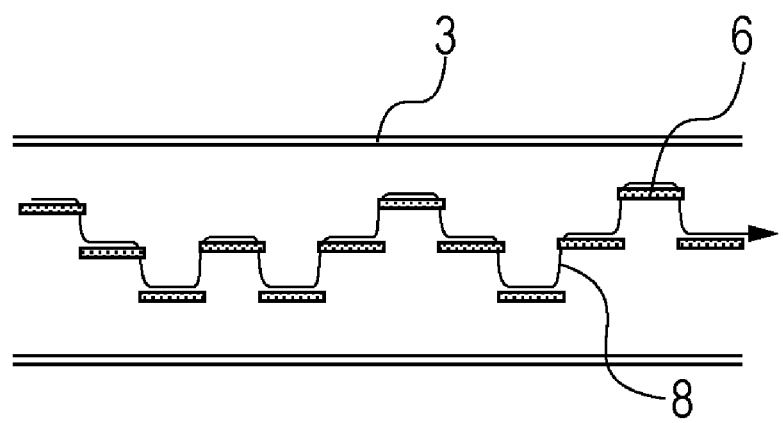

FIGS. 2A and 2B are schematic views each illustrating transfer of electric charges inside a tube containing conjugated polymer chains.

FIG. 2A is a schematic view of the inside of a tube in which conjugated polymer chains 4 having a high molecular weight are formed. In this case, since the conjugated polymer chains 4 have a high molecular weight, intramolecular charge transfer occurs in most areas where electrical charges are transferred from the left end to the right end in the drawing. That is, the number of times intermolecular charge transfer 8 occurs, the charge-transfer rate of which is lower than that of intramolecular charge transfer, is small. The intermolecular charge transfer 8 is a transfer between molecular chains of conjugated polymer chains shown by the vertical transfer in FIG. 2A.

In contrast, the film formed by the technique disclosed in U.S. Patent Application No. 2006/0147677 is schematically shown in FIG. 2B. As shown in FIG. 2B, a large number of molecules of the conjugated polymer 6 having a low molecular weight are formed by the technique disclosed in U.S. Patent Application No. 2006/0147677. Therefore, as for the charge transfer, the number of times intermolecular charge transfer occurs is larger than that in the case of the conjugated polymer chains 4 shown in FIG. 2A.

Because of this reason, conjugated polymer chains that exhibit high electrical conductivity can be obtained by forming the high-molecular-weight conjugated polymer chains of this embodiment.

The film containing conjugated polymer chains of this embodiment will be described in more detail.

(1) Film Containing Conjugated Polymer Chains

Summary of the film containing conjugated polymer chains of this embodiment has been described above. Further embodiments will now be described.

The film containing conjugated polymer chains can include tubular structures each having a diameter in the range of 2 to 50 nm. When the film has a periodic structure, the film is expected to be applied to an optical device or the like, and thus is useful. This structural period can be confirmed by conducting X-ray diffractometry in the Bragg-Brentano geometry and calculating the plane spacing corresponding to an angle range that provides a diffraction peak.

Furthermore, the film can have a structure in which an aggregate of tubular carbon is arranged in the film containing an inorganic component. The term "tubular shape" in this specification includes not only cylindrical columnar shapes, polygonal columnar shapes similar to the cylindrical columnar shapes, but also columnar shapes having distorted cross sections such as an elliptical cross section. Alternatively, the inside of the tube may be filled.

According to the film containing conjugated polymer chains of this embodiment, the diameter of each of the tubes is preferably a meso-size of 2 to 50 nm. In addition, the diameters can be uniform. When the tube has a cylindrical columnar shape, the diameter of the tube is defined as the diameter of the cross section thereof. When the tube has a polygonal columnar shape, the polygon is assumed to be a circle and the diameter of the circle is defined as the diameter. The length of each of the tubular structures is 10 nm to 10 cm, and preferably 1 μm or less. These tubular shape and diameter can be confirmed by microscopy of the cross section of the film, X-ray diffractometry of the film, and the like. The ends of each tube may be either open ends or closed ends.

Examples of the conjugated polymer chains used in the present invention include polymer chains having, as the main chain, a polydiacetylene structure, polypyrrole, or polythiophene. The conjugated polymer chains may have a substituent in their side chains as needed. Examples of the substituent include substituents having an alkyl group and substituents having an oxyalkylene group. In this embodiment, conjugated polymer chains having a molecular weight higher than those in the related art can be formed. The conjugated polymer chains have a molecular weight in the range of 1,600 to 1,000,000, more preferably 5,000 to 1,000,000. The molecular weight of the conjugated polymer chains can be estimated by a change in an absorption spectrum or an emission spectrum. In general, with the increase in the molecular weight, a peak position of the absorption spectrum is shifted to the long-wavelength side.

(2) Orientation Direction of Structures Inside Film Containing Conjugated Polymer Chains In the film containing conjugated polymer chains of this embodiment, a plurality of conjugated polymer chains are oriented. In addition, a plurality of tubular structures are oriented in the film. In such a configuration, the orientation direction of the plurality of tubular structures is parallel to the direction in which the plurality of conjugated polymer chains are oriented and extended. It is known that, in general, conjugated polymer chains have a linear molecular structure due to the π conjugated bonds thereof. Accordingly, extension of a conjugated polymer chain in the circumferential direction of a tube is not advantageous in terms of energy because the molecular structure of the conjugated polymer chain has a distorted shape different from the original structure. As a result, the conjugated polymer chain extends in the direction parallel to the orientation direction of the tubular structure, in which the conjugated polymer chain can have a linear structure that is advantageous in terms of energy.

Furthermore, from the standpoint of application to electronic devices, a film in which such tubular structures are oriented in one direction in the plane of the film can be used.

In this embodiment, an area where the conjugated polymer chains or the tubular structures are oriented can have a side of 10 μm or more, or furthermore, 1 mm or more. Furthermore, the conjugated polymer chains or the tubular structures can be oriented over an area having a side of 1 cm or more. In the case of application to electronic devices, the orientation area preferably has a side of 1 cm or less. However, the length of the side can be changed to, for example, 10 cm or less according to the intended use.

The area where the conjugated polymer chains or the tubular structures of an inorganic component are oriented in one direction is present in a proportion of 50% or more, more preferably 80% or more, still more preferably 95% or more in the plane of the film. Of course, the proportion may be 100%.

(3) Inorganic Component

The inorganic component constituting the film containing conjugated polymer chains of this embodiment may be any of silicon, titanium, zirconium, niobium, tin, tantalum, tungsten, and aluminum. These elements form oxides and become silicon oxide, titanium oxide, zirconium oxide, niobium oxide, tin oxide, tantalum oxide, tungsten oxide, and aluminum oxide. Among these, silicon oxide has a high insulating property, and other electrical conductive layers can be formed on the film. Electrically conductive materials such as tin oxide, titanium oxide, and zirconium oxide can be used as an electrode that supplies a voltage or a current to the conjugated polymer chains.

The film may contain a plurality types of these oxides. Silicon oxide may be doped with a foreign element such as nitrogen or phosphorus or modified with an organic or inorganic compound such as a silane coupling agent or the like, as required.

The oxide constituting the film containing conjugated polymer chains of this embodiment is preferably contained in an amount of 50% or more relative to the total weight.

(4) Covalent Bond Between Inorganic Component and Carbon

In the film containing conjugated polymer chains of this embodiment, the inorganic component composed of an oxide is bonded to carbon atoms constituting the conjugated polymer chains through covalent bonds. Since the inorganic component composed of the oxide is bonded to carbon atoms constituting the conjugated polymer chains through covalent bonds, the distance between the wall portion and the conjugated polymer is exclusively determined on the basis of the molecular structure. For the bonds, bonds that can connect the inorganic component to carbon atoms through covalent bonds are used. Examples thereof include a carbon-silicon bond and a carbon-tin bond.

Ideally, all carbon atoms constituting the conjugated polymer chains have such covalent bonds, that is, the proportion of carbon atoms having such a covalent bond is ideally 100%. However, reactions other than the desired one may occur during polymerization and the like. Therefore, the proportion is actually 80% or more. Such a covalent bond between the organic component and a carbon atom can be confirmed by X-ray photoelectron spectroscopy or the like.

(5) Substrate

The film containing conjugated polymer chains of this embodiment may be formed on a substrate if necessary. The shape of the substrate is basically a planar surface, however, a flexible film or the like can also be used. Examples of the material for the substrate include silicon, quartz, glass, ceramics, polymers (e.g., polyimide), and metals.

As described in U.S. Patent Application No. 2006/0147677, rubbing-treated polyimide can be provided between the film containing conjugated polymer chains and the substrate.

(6) Evaluations

The film containing conjugated polymer chains of this embodiment can be evaluated by transmission electron microscopy, scanning electron microscopy, atomic force microscopy, X-ray diffractometry, infrared absorption spectroscopy, ultraviolet-visible absorption spectroscopy, fluorescent spectroscopy, X-ray photoelectron spectroscopy etc.

The diameter of tubes can be examined by the above microscopy.

The structural period of the film containing conjugated polymer chains of this embodiment can be confirmed by conducting X-ray diffractometry in the Bragg-Brentano geometry and calculating the plane spacing corresponding to an angle that provides a diffraction peak.

The relationship of the angle, the plane spacing, and the wavelength of X-ray used is represented by the Bragg's equation:

$$n\lambda = 2d \sin \theta \quad (1)$$

For example, in a measurement using a Cu-Kα line having a wavelength of 0.1542 nm, when a diffraction peak that provides θ=1° appears, the plane spacing thereof is 4.42 nm and when a diffraction peak that provides θ=2° appears, the plane spacing thereof is 2.21 nm.

In-plane X-ray diffractometry is an example of a method for quantitatively evaluating a phenomenon that a plurality of tubular structures in the film containing conjugated polymer chains are oriented in one direction in the plane of the film.

Specifically, the plane spacing is measured by the radial scan of in-plane X-ray diffractometry to determine the periodic structure in the plane, and in-plane rocking curve measurement is conducted with respect to the diffraction peak, thereby examining the orientation distribution in the same plane. In in-plane X-ray diffractometry, since the angle of incidence of X-ray is very small (e.g., about 0.2°), a wide range of a film (e.g., on the order of cm) is used for the target of analysis. Accordingly, structural information obtained by in-plane X-ray diffractometry can be handled as structural information in the wide range of the film.

When the film containing conjugated polymer chains of this embodiment is evaluated by in-plane X-ray diffractometry, two diffraction peaks separated by 180° are observed in the rocking curve in the same plane. This feature indicates that a plurality of tubular structures in the film containing conjugated polymer chains are oriented in one direction over the plane of the film. Here, the phrase "separated by 180°" means that the distance between the two peaks is within the range of 180±0.5°. Furthermore, in the film containing conjugated polymer chains of this embodiment, the X-ray diffraction peaks in the same plane observed as two peaks have substantially the same diffraction intensity. Herein, the phrase "X-ray diffraction peaks in the same plane observed as two peaks have substantially the same diffraction intensity" means that the value obtained by dividing the peak intensity of a peak representing a higher intensity by the peak intensity of a peak representing a lower intensity is 1 or more and less than 1.5.

When the full width at the half maximum of each peak observed by the in-plane rocking curve measurement is within the range of 80°, it is assumed that the plurality of tubular structure are oriented in one direction over the plane of the film. In addition, the full width at the half maximum of the peak is more preferably within the range of 30°.

The presence of a conjugated polymer can be confirmed by an infrared absorption spectrum, an ultraviolet-visible absorption spectrum, a fluorescent spectrum, or the like. Furthermore, the orientation of polymer chains in a pore can be confirmed by polarization measurement of an absorption spectrum or an emission spectrum.

In the film containing conjugated polymer chains of this embodiment, the extension direction (orientation direction) of a plurality of molecular chains of the conjugated polymer is parallel to the orientation direction of the tubular structures. The phrase "the extension direction of a plurality of molecular chains of the conjugated polymer is parallel to the orientation direction of the tubular structures" means that when the angular dependence of polarization of the observed absorption spectrum or emission spectrum is measured, the peak of the spectrum lies within the range of 0±10° with respect to the orientation direction of the tubular structures of the inorganic component, the orientation direction being observed by X-ray diffractometry.

The presence of bonding between carbon and the inorganic component can be confirmed by X-ray photoelectron spectroscopy or the like.

(Method of Producing Film Containing Conjugated Polymer Chains)

A method of producing a film containing conjugated polymer chains according to an embodiment of the present invention will now be described.

Figure 3:
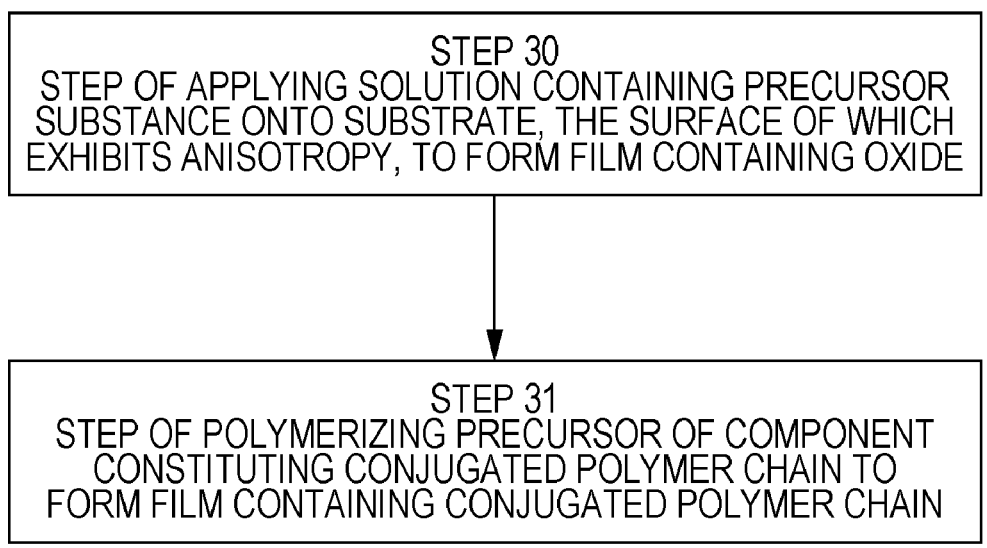
FIG. 3 is a flowchart showing steps of producing a film containing conjugated polymer chains.

FIG. 3 is a conceptual diagram showing steps of the method. In FIG. 3, Step 30 is a step of applying a solution containing a precursor substance onto a substrate, the surface of which exhibits anisotropy, to form a film containing an oxide. Herein, the precursor substance refers to a substance in which an inorganic component of a site containing a precursor of an oxide is connected to carbon of a site containing a precursor of a component constituting the conjugated polymer chain through a covalent bond.

Step 31 shows a subsequent step of polymerizing the precursor of the component constituting the conjugated polymer chain.

Through the above steps, a film containing the conjugated polymer chains can be formed.

The method of producing a film containing conjugated polymer chains according to this embodiment needs Steps 30 and 31. However, these steps may be further divided into substeps.

Each step will now be described in detail.
(Step 30)
(1) Precursor Substance

FIGS. 4A to 4D are conceptual views of precursor substances. A precursor substance shown in FIG. 4A includes a site 40 containing a precursor of an oxide and a site 41 containing a precursor of a component constituting a conjugated polymer chain. Furthermore, an inorganic component in the site 40 containing the precursor of the oxide is connected to a carbon atom in the site 41 containing the precursor of the component constituting the conjugated polymer chain through a covalent bond 5.

Figure 4A:
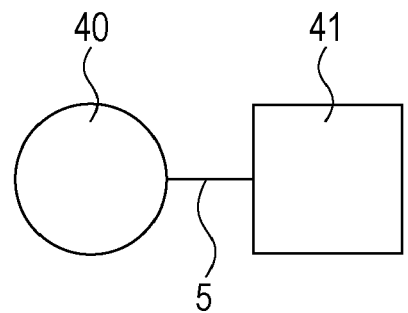
FIGS. 4A to 4D are views showing examples of the structures of precursor substances.
Figure 4B:
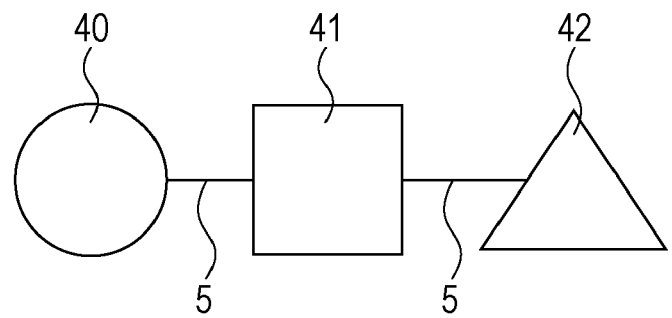
Figure 4C:
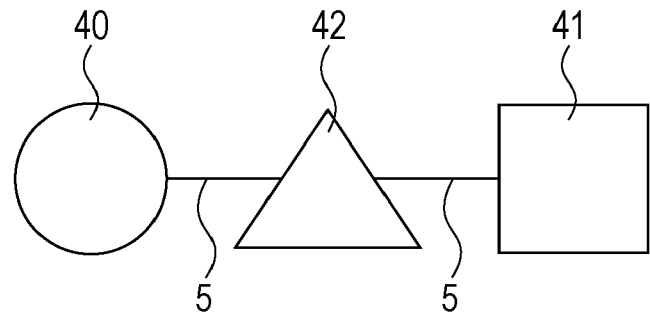
Figure 4D:
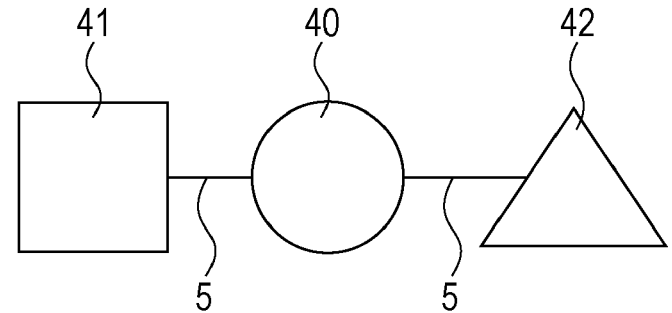

As shown in a precursor substance in FIG. 4B, the precursor substance may further include a site 42 that imparts hydrophobicity. Alternatively, as shown in FIG. 4C, the site 42 that imparts hydrophobicity may be present between the site 40 containing the precursor of the oxide and the site 41 containing the precursor of the component constituting the conjugated polymer chain. In both these precursor substances, the sites are connected to each other through covalent bonds 5. Alternatively, the precursor substance may have the arrangement shown in FIG. 4D.

(1-1) Site Containing Precursor of Oxide

A substance that becomes an oxide after a reaction is used as a precursor of an oxide. When the inorganic component is silicon, a siloxane compound can be used as the precursor of the oxide. Specific examples thereof include oligosiloxane compounds represented by chemical formula [1] or [2]:

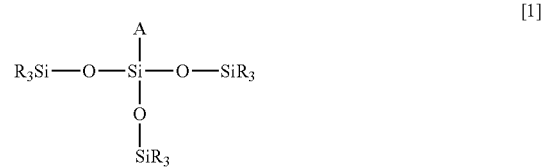

[1]

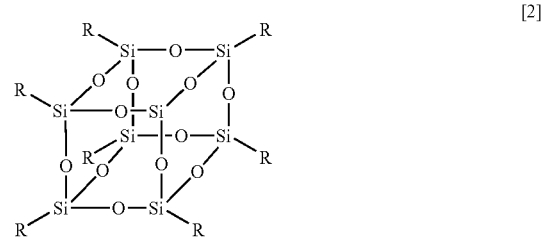

[2]

In chemical formulae [1] and [2], A represents a site containing a precursor of a component constituting a conjugated polymer chain of a precursor substance, and R represents an alkoxy group. Examples of the alkoxy group include an ethoxy group, a propoxy group, a methoxy group, and a butoxy group. These siloxane compounds can be prepared by allowing silicon tetrachloride to react with a molecule having a silanetriol group at a terminal carbon atom, and then conducting alcoholysis reaction with a desired alcohol. The siloxane compounds can be prepared by repeating the reaction with silicon tetrachloride and the alcoholysis reaction.

(1-2) Site Containing Precursor of Component Constituting Conjugated Polymer Chain As the precursor of a component constituting a conjugated polymer, a functional group that can be polymerized after the formation of a film containing an oxide to form a conjugated polymer, or a compound having such a functional group is used. That is, a functional group that forms a conjugated system by polymerization can be used. Examples of the precursor include those having a diacetylene structure, a pyrrole ring, or a thiophene ring.

(1-3) Site that Imparts Hydrophobicity

The site that imparts hydrophobicity may be introduced in order that, in forming a film containing conjugated polymer chains, the site exerts a driving force for forming an aggregate of molecules of the precursor of the conjugated polymer chains. Examples of the driving force include intermolecular hydrophobic interactions and the Van der Waals force. The site that imparts hydrophobicity is not particularly limited, but an alkyl group can be used. For example, the chain length of this alkyl group is 6 to 22 in terms of the number of carbon atoms. The diameter formed by carbon atoms inside a tube can be changed by varying the alkyl chain. In general, the tube diameter can be increased by increasing the chain length of the alkyl group.

(2) Solution Containing Precursor Substance

A solution contains a solvent and a precursor substance. Other substances such as water may be added to the solution if necessary. The solution can be prepared by adding substances constituting a reaction solution, the substances being other than the precursor substance, to the solvent and stirring the resulting mixture. Small steps such as an ultrasonic treatment and filtration may be added as required. Solvents that can dissolve the precursor substance are used as the solvent of the solution. Examples thereof include organic solvents. Specific examples of the organic solvents include tetrahydrofuran, alcohols, chloroform, toluene, ethyl acetate, acetonitrile, dimethylformamide, dimethylacetamide, dimethyl sulfoxide, N-methylpyrrolidone, and acetic acid. These organic solvents may be used alone or as a mixture of two or more solvents. Other substances may be optionally added to the solution as other additives. For example, when a precursor site of silicon oxide is present, water, which hydrolyzes the precursor site and finally provides silicon oxide, may be added to the solution. Substances for adjusting acidity or basicity of the solution may be further added. Examples of the substances for adjusting acidity or basicity include acids such as hydrochloric acid and bases such as ammonium hydroxide. These substances are often added in order to control the hydrolysis and the condensation reaction rate of the precursor substance.

(3) Substrate, the Surface of which Exhibits Anisotropy

The substrate, the surface of which exhibits anisotropy, and which is described in U.S. Patent Application No. 2006/0147677 can be used.

(4) Step of Forming Film Containing Oxide

The step of forming a film containing an oxide can be conducted by the method disclosed in U.S. Patent Application No. 2006/0147677. For example, a dip coating method may be employed. In this case, as a solvent is lost from a solution after the application of the solution onto a substrate, condensation of the precursor of silicon oxide proceeds to form silicon oxide. The hydrolysis and the condensation reaction rate of the precursor substance of silicon oxide are controlled by adjusting the temperature condition and the humidity condition, thus changing the regularity of the arrangement of an aggregate. For example, an excessive temperature increase leads to acceleration of condensation reaction, which may impair the formation of a uniform film. On the other hand, an excessively low temperature decreases the rate of solvent evaporation, and it takes a long time to form a film. Preferably, for example, the temperature is in the range of 0° C. to 50° C. and the relative humidity is in the range of 0% to 50%. The hold time is determined in accordance with the reactivity of the precursor substance used, the temperature, and the humidity. A specific example of the hold time is in the range of 30 minutes to 1 week.

The thickness of the film subjected to the above step is not particularly limited, but is, for example, 0.005 μm to ten and several micrometers. For example, in the case of the dip coating method, a film having a thickness in the range of about 0.05 μm to 3 μm can be formed.

(Step 31)

In this step, stimulation is applied to a precursor constituting a conjugated polymer contained in the oxide-containing film prepared in Step 30, thereby starting polymerization reaction to form conjugated polymer chains. Examples of the stimulation include heat, light, and chemical stimulation. An example of the chemical stimulation is addition of an oxidizing initiator. Specific examples of the initiator include trivalent iron salts, divalent copper salts, permanganates, dichromates, and peroxides. These initiators may be used alone or in combination of two or more types thereof. This chemical stimulation also includes electrochemical stimulation. Specifically, for example, electrodes may be brought into contact with a film containing conjugated polymer chains, and a voltage may be applied from an external circuit to polymerize a precursor of the conjugated polymer chains. The method of polymerization is not particularly limited. For example, in thermal polymerization, a film may be held in a predetermined heating environment. In photopolymerization, a film may be held under light irradiation. In chemical polymerization, a film may be immersed in a solution of an initiator.

Furthermore, a step of doping the conjugated polymer with other substances may be added if necessary. Examples of this dopant include halogens (e.g., chlorine, bromine, and iodine), halides (e.g., fluorine iodide, chlorine iodide, and bromine iodide), Lewis acids (e.g., $PF_6$, $AsF_5$, $SbF_6$, and $BF_3$), acids (hydrofluoric acid, hydrochloric acid, and perchloric acid), and transition metal compounds (e.g., $FeCl_3$ and $TiCl_3$). The doping method is not particularly limited. For example, the doping can be conducted by immersing a film containing an oxide in a solution of the dopant mentioned above.

EXAMPLES

The above embodiment will now be described in more detail by way of Examples. However, methods of the embodiment are not limited to Examples.

Example 1

(1) Synthesis of Precursor Substance

A method of synthesizing a precursor substance represented by chemical formula [3] will be described below.

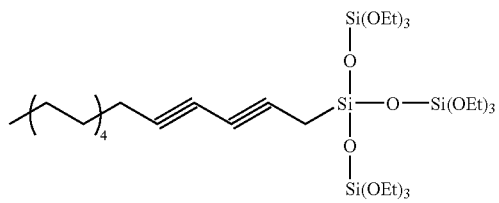

[3]

At −78° C., 1.3 equivalents of butyllithium and 1.5 equivalents of trimethylsilyldiazomethane were added to tetrahydrofuran, and the resulting solution was stirred for 30 minutes. Subsequently, 1 equivalent of 1-undecanal was added thereto, and the solution was stirred for one hour. The temperature of the solution was increased to 0° C., and the mixture was further stirred for one hour. The resulting solution was washed with a saturated aqueous solution of ammonium chloride, and then extracted with hexane.

The organic layer was dried over sodium sulfate, and the solvent was distilled off to prepare 1-dodecyn.

1,3-Dichloropropene was refluxed with a saturated aqueous solution of sodium carbonate. The resulting solution was extracted with diethyl ether and then dried to prepare 3-chloro-2-propene-1-ol.

3-Chloro-2-propene-1-ol was refluxed with 3.8% sodium hydroxide. The resulting solution was extracted with diethyl ether and then dried to prepare 1-propyn-3-ol.

One equivalent of bromine, 3 equivalents of sodium hydroxide, and 1 equivalent of 1-propyn-3-ol were added to an aqueous solution under ice-cooling, and a reaction was conducted at 0° C. for four hours. The temperature of the reaction solution was increased to room temperature, and the solution was extracted with chloroform. The organic layer was separated, dried over sodium sulfate, and concentrated to prepare 1-bromopropyn-3-ol.

Hydrochloric acid and 1 equivalent of dihydropyran were added to a chloroform solution of 1 equivalent of 1-bromopropyn-3-ol, and the mixture was stirred at room temperature to prepare 3-(5-tetrahydropyranoxy)-1-bromopropyn.

Next, 0.1 equivalents of copper (I) iodide was dissolved in pyrrolidine, and 1 equivalent of 1-dodecyn was added thereto at 0° C. A solution of 1 equivalent of 3-(5-tetrahydropyranoxy)-1-bromopropyn was added dropwise to the solution over a period of two hours, and the resulting solution was stirred for 30 minutes. The solution was poured into a mixture of ice and diethyl ether. The resulting solution was extracted with diethyl ether, washed with saturated aqueous solutions of ammonium chloride and sodium hydrogencarbonate, and dried over sodium sulfate. The solvent was then distilled off to prepare 1-(5-tetrahydropyranoxy)tetradeca-2,4-diyne.

1-(5-Tetrahydropyranoxy)tetradeca-2,4-diyne was added to a 0.1M aqueous hydrochloric acid solution. The solution was stirred and then extracted with diethyl ether. The organic layer was dried over sodium sulfate, and the solvent was distilled off to prepare tetradeca-2,4-diyne-1-ol.

One equivalent of pyridine was added to a diethyl ether solution of 1 equivalent of tetradeca-2,4-diyne-1-ol, and a diethyl ether solution of 0.75 equivalents of phosphorus trichloride was added dropwise to the solution at 0° C. The reaction solution was stirred at room temperature for two days, and a saturated aqueous sodium hydrogencarbonate solution was then added thereto to neutralize the solution. Subsequently, the solution was extracted with diethyl ether. The organic layer was washed with a saturated aqueous sodium hydrogencarbonate solution and water, and dried over sodium sulfate. The solvent was then distilled off to prepare 1-bromo-tetradeca-2,4-diyne.

One equivalent of 1-bromo-tetradeca-2,4-diyne and 3 equivalents of magnesium metal were added to a tetrahydrofuran solvent under dry argon. A reaction was conducted at room temperature for 12 hours. The reaction solution was added to a tetrahydrofuran solution of 4 equivalents of silicon tetrachloride, and a reaction was conducted at room temperature overnight. The solvent and unreacted silicon tetrachloride were removed by distillation. The residue was dispersed in dry hexane, and the supernatant was distilled in vacuum to prepare 1-(trichlorosilyl)tetradeca-2,4-diyne.

On an ice bath, 3.3 equivalents of water and a 1/1 solution of tetrahydrofuran/diethyl ether containing 3.3 equivalents of aniline were added dropwise to a diethyl ether solution of 1 equivalent of 1-(trichlorosilyl)tetradeca-2,4-diyne under vigorous stirring. Stirring was conducted for three hours, and the resulting precipitate was removed by filtration. Subsequently, the solvent was partially distilled off, and hexane was added to the resulting solution. Furthermore, the solvent was distilled off under reduced pressure to prepare 1-(trihydroxysilyl)tetradeca-2,4-diyne.

An excessive amount of silicon tetrachloride and hexane were added to a tetrahydrofuran solution of 1-(trihydroxysilyl)tetradeca-2,4-diyne, and the solution was vigorously stirred at room temperature. The solvent and unreacted silicon tetrachloride were distilled off under reduced pressure. An excessive amount of methanol was added to the resulting product, and 9 equivalents of pyridine and an excessive amount of hexane were added thereto. The resulting precipitate was removed by filtration, and the solvent was distilled off under reduced pressure. The resulting product was distilled under reduced pressure to obtain the compound represented by chemical formula [3].

(2) Step of Preparing Reaction Solution

The precursor substance represented by chemical formula [3], water, and hydrochloric acid were dissolved in tetrahydrofuran, and the mixture was stirred to prepare a reaction solution. In this example, the molar ratio of tetrahydrofuran/precursor substance represented by chemical formula [3]/water/hydrochloric acid was 50/1/50/0.002.

(3) Preparation of Substrate, the Surface of which Exhibits Anisotropy

A silicon wafer (100) was cleaned with UV/ozone, and an N-methylpyrrolidone (NMP) solution of a polyamic acid was applied onto the wafer by spin coating. The wafer was baked at 200° C. for one hour to form a thin film of polyimide A having the structure represented by chemical formula [4].

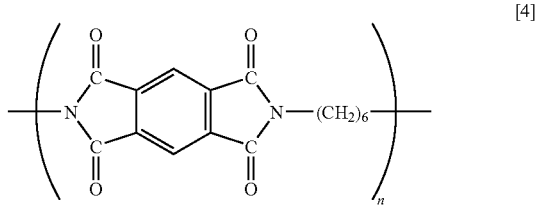

[4]

Polyimide A

A rubbing treatment was performed in one direction over the entire surface of the above substrate under the conditions shown in Table 1 below. Thus, a substrate, the surface of which exhibits anisotropy, was prepared.

TABLE 1

| Rubbing conditions of polyimide A | |
|---|---|
| Material of cloth | Nylon |
| Roller diameter (mm) | 24 |
| Amount of press (mm) | 0.3 |
| Number of revolutions (rpm) | 1,000 |
| Stage speed (mm/min) | 600 |
| Number of repeated revolutions | 4 |

Figure 5A:
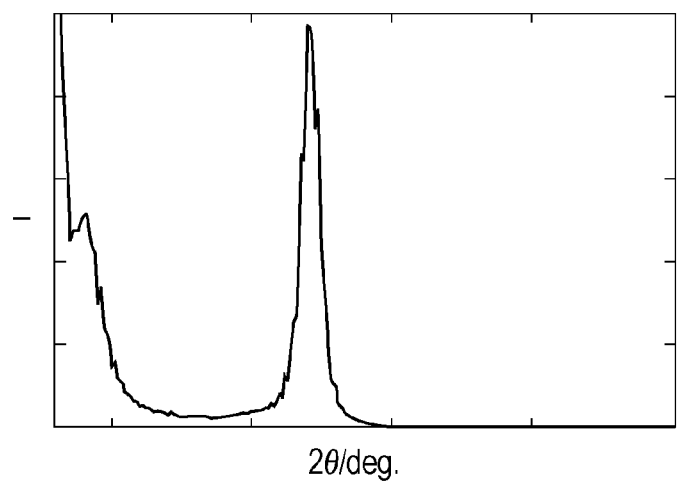
FIGS. 5A to 5C are graphs showing experimental results of Example 1.
Figure 5B:
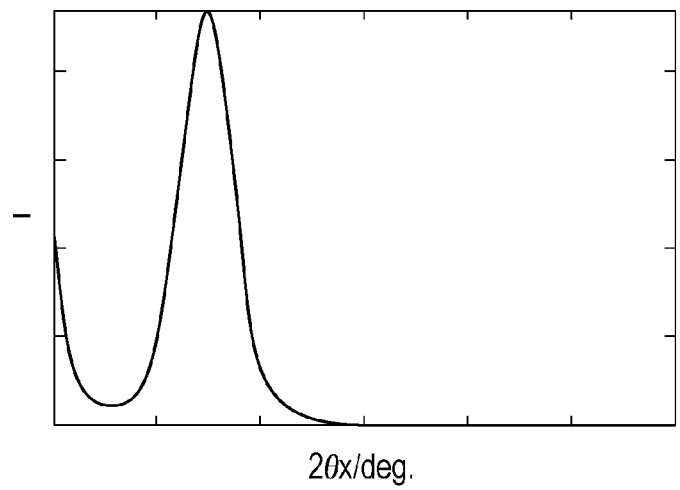
Figure 5C:
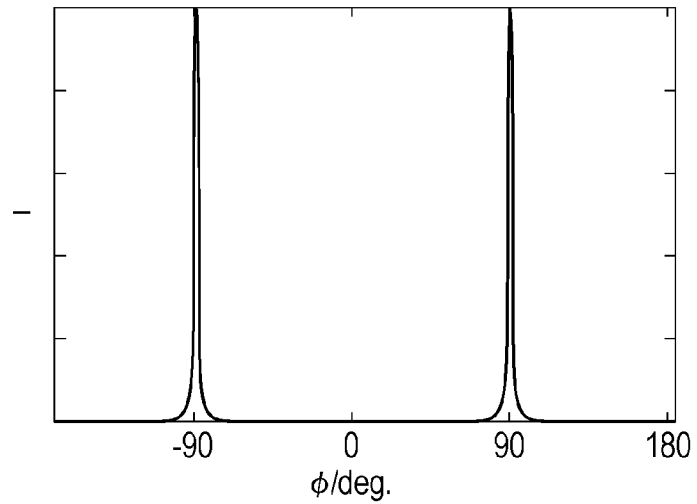

(4) Application of Reaction Solution and Formation of Film Containing Conjugated Polymer Chains The reaction solution was applied onto the rubbed substrate coated with the polyimide by a dip coating method. The dip coating was conducted on the substrate at a pulling rate of 2 mm/s. The substrate was held in an environmental testing device in which the humidity and the temperature could be controlled in air. The substrate was held in the environmental testing device at 25° C. and 30% RH for two days to prepare a film containing conjugated polymer chains. As a result, a uniform film was formed on the substrate. For the prepared film containing conjugated polymer chains, X-ray diffractometry in the Bragg-Brentano geometry and in-plane X-ray diffractometry were conducted. FIG. 5A shows an example of the result of X-ray diffractometry in the Bragg-Brentano geometry. FIG. 5B shows an example of the result of the radial scan of in-plane X-ray diffractometry. FIG. 5C is an example of the result of in-plane rocking curve measurement. The result of the X-ray diffractometry in the Bragg-Brentano geometry shown in FIG. 5A provided a diffraction peak corresponding to a plane spacing of about 5 nm. As shown in FIGS. 5A and 5B, it was confirmed that the film containing conjugated polymer chains had a high orderliness both in the stacking direction and in the in-plane direction. Furthermore, in FIG. 5C, two diffraction peaks separated by 180° were observed in the rocking curve in the same plane. This result showed that a plurality of tubular structures inside the prepared film containing conjugated polymer chains were oriented over the plane of the film in one direction perpendicular to the rubbing direction.

(5) Polymerization

The film containing conjugated polymer chains was heated at 170° C. for three hours in a nitrogen atmosphere to polymerize a diacetylene group contained in the precursor of the component constituting the conjugated polymer. Infrared absorption spectra of the film containing conjugated polymer chains before and after the heating were measured by the attenuated total reflection (ATR) method. An absorption band of an acetylene bond observed at 2,260 cm$^{-1}$ in the film before the heating disappeared after the heating. On the other hand, the other peaks were not significantly changed. This result showed that polymerization reaction of the diacetylene groups occurred without decomposition of other sites of the precursor substance. Furthermore, fluorescence, which was not observed before the heating, was observed in the film after the heating. This result showed that polydiacetylene was formed in the film containing conjugated polymer chains. Here, the angular dependence of polarization of the observed fluorescence was examined. As a result, the angle of the polarization showing the peak of the fluorescence coincided with the orientation direction of the tubular inorganic component, the orientation direction being confirmed by in-plane X-ray diffractometry. This result showed that the orientation direction of molecular chains of the conjugated polymer in the film containing conjugated polymer chains was parallel to the orientation direction of the tubes. Furthermore, by providing a light-irradiating portion that irradiates first light and by irradiating the conjugated polymer chains with the first light, the film can be applied to a light-emitting device that emits second light from the conjugated polymer chains.

Example 2

A quartz substrate was washed with ultrasonic waves using an organic solvent and cleaned with UV/ozone. Subsequently, an NMP solution of a polyamic acid was applied onto the substrate by spin coating. The substrate was baked at 200° C. for one hour to form a thin film of polyimide A represented by chemical formula [4].

A mask was placed on a part of the substrate having the polyimide film thereon so that a part of the substrate was exposed. In this state, a rubbing treatment was conducted in one direction over the entire surface of the substrate including the mask under the conditions shown in Table 1. Thus, a substrate, a part of the surface of which had an orientation-regulating force, was prepared. In this step, the ratio of the exposed portion to the entire surface of the substrate was controlled to be 50%, 80%, and 95%.

Subsequently, step (4) of Example 1 was conducted using the same reaction solution as that prepared in step (2) of Example 1 to prepare films containing conjugated polymer chains in which the ratio of an area where molecular chains of the conjugated polymer inside the tubes were oriented in one direction in the plane of each film to the entire surface of the substrate was 50%, 80%, and 95%.

Example 3

(1) Synthesis of Precursor Molecule

A method of synthesizing a precursor molecule represented by chemical formula [5] will be described below.

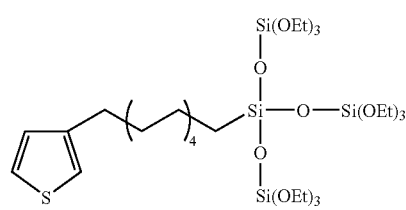

[5]

A solution was prepared by adding 1 equivalent of 4-methoxyphenol to a methanol solution of 20 wt % potassium hydroxide. The solution was added dropwise to a diethyl ether solution of 2 equivalents of 1,10-dibromodecane. The reaction solution was refluxed for one hour, and the solvent was then distilled off. Water was added thereto, and the organic component was extracted with hexane. The residue was washed with an aqueous sodium hydroxide solution and water, and then distilled under reduced pressure to prepare 1-bromo-10-(4-methoxyphenoxy)decane.

Hydrobromic acid, 1 equivalent of 3-bromothiophene, and 1 equivalent of 1-bromo-10-(4-methoxyphenoxy)decane were added to acetic anhydride, and the resulting reaction solution was refluxed for three hours. The reaction solution was poured into water, and the organic component was extracted with hexane. The solvent was distilled off under reduced pressure to prepare 3-(10-bromodecyl)thiophene.

One equivalent of 3-(10-bromodecyl)thiophene and 3 equivalents of magnesium metal were added to a tetrahydrofuran solvent under dry argon. A reaction was conducted at room temperature for 12 hours. The reaction solution was added to a tetrahydrofuran solution of 4 equivalents of silicon tetrachloride, and a reaction was conducted at room temperature overnight. The solvent and unreacted silicon tetrachloride were removed by distillation. The residue was dispersed in dry hexane, and the supernatant was distilled in vacuum to prepare 3-(10-(trichlorosilyl)decyl)thiophene.

On an ice bath, 3.3 equivalents of water and a 1/1 solution of tetrahydrofuran/diethyl ether containing 3.3 equivalents of aniline were added dropwise to a diethyl ether solution of 1 equivalent of 3-(10-(trichlorosilyl)decyl)thiophene under vigorous stirring. Stirring was conducted for three hours, and the resulting precipitate was removed by filtration. Subsequently, the solvent was partially distilled off, and hexane was added to the resulting solution. Furthermore, the solvent was distilled off under reduced pressure to prepare 3-(10-(trihydroxysilyl)decyl)thiophene.

An excessive amount of silicon tetrachloride and hexane were added to a tetrahydrofuran solution of 3-(10-(trihydroxysilyl)decyl)thiophene, and the solution was vigorously stirred at room temperature. The solvent and unreacted silicon tetrachloride were distilled off under reduced pressure. An excessive amount of methanol was added to the resulting product, and 9 equivalents of pyridine and an excessive amount of hexane were added thereto. The resulting precipitate was removed by filtration, and the solvent was distilled off under reduced pressure. The resulting product was distilled under reduced pressure to obtain the compound represented by chemical formula [5].

(2) Step of Preparing Reaction Solution

The precursor molecules each represented by chemical formula [5], water, and hydrochloric acid were added to and dissolved in tetrahydrofuran, and the mixture was stirred to prepare a reaction solution. In this example, the molar ratio of tetrahydrofuran/precursor molecule represented by chemical formula [5]/water/hydrochloric acid was 100/1/35/0.5.

(3) Formation of Film Containing Conjugated Polymer Chains

A film containing conjugated polymer chains was formed by the same steps as steps (3) and (4) of Example 1. For the prepared film containing conjugated polymer chains, X-ray diffractometry in the Bragg-Brentano geometry and in-plane X-ray diffractometry were conducted. It was confirmed that, as in (4) of Example 1, the film containing conjugated polymer chains provided a diffraction peak corresponding to a plane spacing of about 5 nm, and had a high orderliness both in the stacking direction and in the in-plane direction. It was also confirmed that a plurality of tubular structures composed of carbon in the film were oriented over the plane of the film in one direction perpendicular to the rubbing direction.

(4) Polymerization

The film containing conjugated polymer chains was immersed in a diethyl ether solution of iron (III) chloride at room temperature for one minute to polymerize a thiophene group of the precursor of the component constituting the conjugated polymer. Ultraviolet-visible-near-infrared absorption spectra of the film containing conjugated polymer chains before and after the immersion were measured. A broad absorption was observed at 1,000 nm only in the spectrum of the thin film after the immersion. This result indicated that polymerization reaction occurred between precursor molecules of the component constituting the conjugated polymer. Specifically, it was confirmed that polythiophene was produced in the film containing conjugated polymer chains. Here, the angular dependence of polarization of the observed absorption was examined. As a result, the angle of the polarization showing the peak of the absorption coincided with the orientation direction of the tubular structures, the orientation direction being confirmed by in-plane X-ray diffractometry. This result showed that the orientation direction of molecular chains of the conjugated polymer in the film containing conjugated polymer chains was parallel to the orientation direction of the tubular structures.

In the film containing conjugated polymer chains according to an embodiment of the present invention, the distance between a wall portion and a conjugated polymer is exclusively determined by the molecular structure whereby a conjugated polymer having a high molecular weight can be produced. Furthermore, because of this feature, a conjugated polymer having a high electrical conductivity can be obtained. Therefore, the film containing conjugated polymer chains according to an embodiment of the present invention can be used as a material for electronic devices or optical devices.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2009-135312 filed Jun. 4, 2009, which is hereby incorporated by reference herein in its entirety.

What is claimed is:

1. A film comprising:
    an oxide having a plurality of tubular structures; and
    a plurality of conjugated polymer chains that are present in pores of the tubular structures,
    wherein the tubular structures are oriented,
    wherein the extension direction of the conjugated polymer chains is parallel to the orientation direction of the tubular structures, and
    wherein an inorganic component of the oxide is connected to carbon constituting the conjugated polymer chains through a covalent bond.

2. A light-emitting device comprising:
    the film according to claims 1; and
    a light-irradiating portion that irradiates the conjugated polymer chains in the film with first light,
    wherein the conjugated polymer chains emit second light due to the irradiation of the first light.

3. An electronic device comprising:
    the film according to claim 1; and
    a plurality of electrodes that are electrically connected to the conjugated polymer chains in the film.

4. A method of producing a film containing an oxide having a plurality of tubular structures and a plurality of conjugated polymer chains, comprising:
    preparing a solution by dissolving a precursor substance having a first site containing a precursor of the oxide and a second site containing a precursor of a component constituting the conjugated polymer chains;
    forming a film containing the oxide having the tubular structures on a substrate, the surface of which exhibits anisotropy, by applying the solution onto the substrate so that the tubular structures and the conjugated polymer chains are oriented; and
    forming the conjugated polymer chains in pores of the tubular structures by polymerizing the second site in the film formed on the substrate,
    wherein an inorganic component of the first site is connected to carbon of the second site through a covalent bond.

5. The method according to claim 4, wherein, in the step of forming the conjugated polymer chains, the second site is polymerized by applying any of heat, light, and chemical stimulation.

6. The method according to claim 4, wherein the precursor of the component constituting the conjugated polymer chains contains a diacetylene structure, a pyrrole ring, or a thiophene ring.

7. The method according to claim 4, wherein the oxide is silicon oxide, titanium oxide, zirconium oxide, niobium oxide, tin oxide, tantalum oxide, tungsten oxide, or aluminum oxide.

* * * * *